United States Patent
Ohiwa et al.

(10) Patent No.: US 10,942,351 B2
(45) Date of Patent: Mar. 9, 2021

(54) WORK VEHICLE AND DISPLAY CONTROL METHOD

(71) Applicant: KOMATSU LTD., Tokyo (JP)

(72) Inventors: Kenji Ohiwa, Tokyo (JP); Masao Yamamura, Tokyo (JP); Tomohiro Nakagawa, Tokyo (JP)

(73) Assignee: KOMATSU LTD., Tokyo (JP)

( * ) Notice: Subject to any disclaimer, the term of this patent is extended or adjusted under 35 U.S.C. 154(b) by 371 days.

(21) Appl. No.: 16/062,157

(22) PCT Filed: Nov. 29, 2016

(86) PCT No.: PCT/JP2016/085348
§ 371 (c)(1),
(2) Date: Jun. 14, 2018

(87) PCT Pub. No.: WO2017/110383
PCT Pub. Date: Jun. 29, 2017

(65) Prior Publication Data
US 2018/0373032 A1     Dec. 27, 2018

(30) Foreign Application Priority Data
Dec. 25, 2015   (JP) .............................. JP2015-253705

(51) Int. Cl.
*G02B 27/01*   (2006.01)
*E02F 3/43*    (2006.01)
(Continued)

(52) U.S. Cl.
CPC .......... *G02B 27/0101* (2013.01); *E02F 3/435* (2013.01); *E02F 9/2228* (2013.01);
(Continued)

(58) Field of Classification Search
CPC ........ G02B 27/0101; G02B 2027/0141; G02B 2027/014; E02F 9/265; E02F 3/435; E02F 3/32; E02F 9/2228; E02F 9/262
See application file for complete search history.

(56) References Cited

U.S. PATENT DOCUMENTS 5,721,679 A  *  2/1998  Monson ............... A01B 79/005
                                                345/7
9,556,593 B2 *  1/2017  Nomura .................. G01S 19/53
(Continued)

FOREIGN PATENT DOCUMENTS

CN     103080437 A    5/2013
CN     103857852 A    6/2014
(Continued)

*Primary Examiner* — Ramsey Refai
(74) *Attorney, Agent, or Firm* — Faegre Drinker Biddle & Reath LLP

(57) ABSTRACT

A work vehicle includes: a main body having a cab; a display device provided in the cab and configured to display work assistance information to be overlaid on an actual view of a work site; a display controller configured to cause the work assistance information to be displayed on the display device; and a bucket position detector configured to detect a position of a bucket relative to the main body. The display controller is configured to cause a display position of the work assistance information on the display device to follow a movement of the bucket. The display controller is configured to change a display manner of the work assistance information on the display device based on the position detected by the bucket position detector, when the bucket is moved relative to the cab in a forward direction and a rearward direction.

10 Claims, 10 Drawing Sheets

(51) Int. Cl.
*E02F 9/22* (2006.01)
*E02F 9/26* (2006.01)
*E02F 3/32* (2006.01)

(52) U.S. Cl.
CPC .............. *E02F 9/262* (2013.01); *E02F 9/265* (2013.01); *E02F 3/32* (2013.01); *G02B 2027/014* (2013.01); *G02B 2027/0141* (2013.01)

(56) References Cited

U.S. PATENT DOCUMENTS

| | | | |
|---|---|---|---|
| 9,616,748 B2* | 4/2017 | Tsubone | E02F 9/16 |
| 2005/0256607 A1* | 11/2005 | Shepherd | E02F 9/26 |
| | | | 700/213 |
| 2006/0103590 A1* | 5/2006 | Divon | H04M 1/6091 |
| | | | 345/7 |
| 2013/0158787 A1 | 6/2013 | Nomura et al. | |
| 2014/0188333 A1* | 7/2014 | Friend | E02F 9/267 |
| | | | 704/34.4 |
| 2015/0218781 A1* | 8/2015 | Nomura | G09G 5/37 |
| | | | 701/50 |
| 2016/0193920 A1 | 7/2016 | Tsubone et al. | |

FOREIGN PATENT DOCUMENTS

| | | |
|---|---|---|
| JP | H01-312129 A | 12/1989 |
| JP | 2005-162154 A | 6/2005 |
| JP | 2009-243073 A | 10/2009 |
| JP | 2013-113044 A | 6/2013 |
| JP | 2014-129676 A | 7/2014 |
| JP | 5781668 B2 | 9/2015 |
| JP | 2016-102312 A | 6/2016 |
| KR | 10-2015-0082601 A | 7/2015 |
| WO | WO 2014/103498 A | 7/2014 |

\* cited by examiner

WORK VEHICLE AND DISPLAY CONTROL METHOD

TECHNICAL FIELD

The present invention relates to a work vehicle and a display control method, particularly, a work vehicle having a bucket and a display control method in the work vehicle.

BACKGROUND ART

Conventionally, a work vehicle such as a hydraulic excavator has been known. Such a work vehicle has a main body and a work implement connected to the main body. For example, a work implement of a hydraulic excavator has a boom, a dipper stick, and a bucket in the stated order as seen on the side of the main body.

Japanese Patent Laying-Open No. 2009-243073 (Patent Document 1) discloses a hydraulic excavator as an example of a work vehicle. The hydraulic excavator includes a cab, a work implement, a display device, and a display position processor. The work implement is operated in response to a manipulation by an operator in the cab. The display device is provided in the cab and displays a predetermined image. The display position processor changes the display position of the image in the display device in response to a movement of the work implement. Particularly, the display device is a transparent display provided at the front surface of the cab.

CITATION LIST

Patent Document

PTD 1: Japanese Patent Laying-Open No. 2009-243073

SUMMARY OF INVENTION

Technical Problem

As the bucket of the work vehicle becomes closer to the cab, the bucket looks larger for the operator in the cab. Therefore, as the bucket becomes closer to the cab, work assistance information serving as the predetermined image is more likely to overlap with the bucket for the operator. This may lead to decreased operability of the work vehicle.

The present invention has been made in view of the above-described problem, and has an object to provide a work vehicle that can improve operability of the work vehicle by appropriately controlling displaying of work assistance information, as well as a display control method in the work vehicle.

Solution to Problem

According to an aspect of the present invention, a work vehicle includes: a work implement having a bucket; a main body to which the work implement is attached, the main body having a cab; a display device provided in the cab and configured to display work assistance information to be overlaid on an actual view of a work site; a display controller configured to cause the work assistance information to be displayed on the display device; and a bucket position detector configured to detect a position of the bucket relative to the main body. The display controller is configured to cause a display position of the work assistance information on the display device to follow a movement of the bucket. The display controller is configured to change a display manner of the work assistance information on the display device based on the detected position, when the bucket is moved relative to the cab in a forward direction and a rearward direction.

When the bucket is moved in the forward direction and the rearward direction, the size of the bucket visually recognized by the operator in the cab through the display device is changed. Hence, in order to improve the operability of the work vehicle, it may be preferable to change the display manner of the work assistance information in accordance with the visually recognized size of the bucket. Therefore, by changing the display manner of the work assistance information on the display device based on the position of the bucket when the bucket is moved relative to the cab in the forward direction and the rearward direction as in the above-described configuration, the operability of the work vehicle can be improved as compared with a configuration in which the display manner is not changed upon the movement of the bucket in the forward direction and the rearward direction.

Preferably, the display controller is configured to change a size of the work assistance information based on the detected position, when the bucket is moved in the forward direction and the rearward direction.

According to the above-described configuration, the operability of the work vehicle can be improved as compared with a configuration in which the display size of the work assistance information is not changed upon the movement of the bucket in the frontward direction and the rearward direction.

Preferably, the display controller is configured to cause the work assistance information to be displayed on the display device in a first size when the bucket is at a first position. The display controller is configured to cause the work assistance information to be displayed on the display device in a second size smaller than the first size, when the bucket is at a second position closer to the cab than the first position.

According to the above-described configuration, the display size of the work assistance information when the bucket is at the second position at which the bucket is visually recognized as being large when viewed by the operator in the cab becomes smaller than the display size of the work assistance information when the bucket is at the first position. Hence, in the work vehicle, the work assistance information can continue to be displayed around the bucket even when the bucket reaches the second position closer to the operator's seat.

Preferably, the display controller is configured not to cause the work assistance information to be displayed on the display device when the bucket is at a third position closer to the cab than the second position.

The visually recognized size of the bucket by the operator in the cab when the bucket is at the third position is larger than the visually recognized size of the bucket when the bucket is at the second position. In such a case, if the size of the work assistance information is decreased to be too small, the operator cannot accurately recognize the content indicated by the work assistance information. Hence, when the bucket is at the third position closer to the cab than the second position, the work assistance information stops being displayed, whereby the operability of the work vehicle can be improved.

Preferably, as the bucket becomes closer to the cab, the display controller is configured to gradually decrease the size of the work assistance information.

According to the configuration, as the bucket becomes closer to the cab, the displayed work assistance information becomes gradually smaller. Hence, the operability of the work vehicle can be improved as compared with a case of abruptly changing the size of the work assistance information.

Preferably, the display controller is configured to cause the work assistance information to be displayed on the display device in a predetermined size when the bucket is at a first position and when the bucket is at a second position closer to the cab than the first position. The display controller is configured not to cause the work assistance information to be displayed on the display device when the bucket is at a third position closer to the cab than the second position.

The visually recognized size of the bucket by the operator in the cab when the bucket is at the third position is larger than the visually recognized size of the bucket when the bucket is at the second position. In such a case, the work assistance information may be unable to be caused to follow the bucket. Therefore, by stopping displaying the work assistance information at the third position as in the above-described configuration, the situation in which the display position of the work assistance information cannot follow the bucket can be handled.

Preferably, the display controller is configured to control the display position of the work assistance information on the display device such that the work assistance information is visually recognized at a left position or a right position relative to the bucket when viewed from the cab.

According to the above-described configuration, the work assistance information is not displayed at least below the teeth. Therefore, displaying can be performed with excellent workability for the operator.

Preferably, the work implement is provided at a right side relative to the cab. The display controller is configured to control the display position of the work assistance information on the display device such that the work assistance information is visually recognized at the left position relative to the bucket when viewed from the cab.

According to the above-described configuration, the work assistance information can be displayed in a manner suitable in view of the attachment position of the work implement to the main body.

Preferably, when the bucket is at the first position, the display controller is configured to control the display position of the work assistance information on the display device such that the work assistance information is visually recognized at one of a left position and a right position relative to the bucket when viewed from the cab. When the bucket is at the second position, the display controller is configured to control the display position of the work assistance information on the display device such that the work assistance information is visually recognized at the other of the left position and the right position relative to the bucket when viewed from the cab.

According to the above-described configuration, even when the bucket becomes close to the cab, the work assistance information can continue to be displayed around the bucket.

Preferably, the display controller is configured to cause the display position of the work assistance information on the display device to follow the movement of the bucket such that the work assistance information is visually recognized around the bucket when viewed from the cab.

According to the above-described configuration, the work assistance information can be prevented from overlapping with the bucket when viewed. Moreover, since the work assistance information follows the bucket to be around the bucket, the visibility of the work assistance information is improved.

According to an aspect of the present invention, a display control method in a work vehicle is performed in a work vehicle including: a work implement having a bucket, a main body to which the work implement is attached, the main body having a cab; and a display device provided in the cab and configured to display work assistance information to be overlaid on an actual view of a work site. The display control method includes: detecting a position of the bucket relative to the main body; displaying the work assistance information on the display device while causing the work assistance information to follow a movement of the bucket; and changing a display manner of the work assistance information on the display device based on the detected position when the bucket is moved relative to the cab in a forward direction and a rearward direction.

According to the above-described method, by changing the display manner of the work assistance information on the display device based on the position of the bucket when the bucket is moved relative to the cab in the forward direction and the rearward direction, the operability of the work vehicle can be improved as compared with a configuration in which the display manner is not changed upon the movement of the bucket in the forward direction and the rearward direction.

Advantageous Effects of Invention

According to the invention above, the operability of the work vehicle can be improved.

DESCRIPTION OF EMBODIMENTS

<A. General Configuration>

Figure 1:
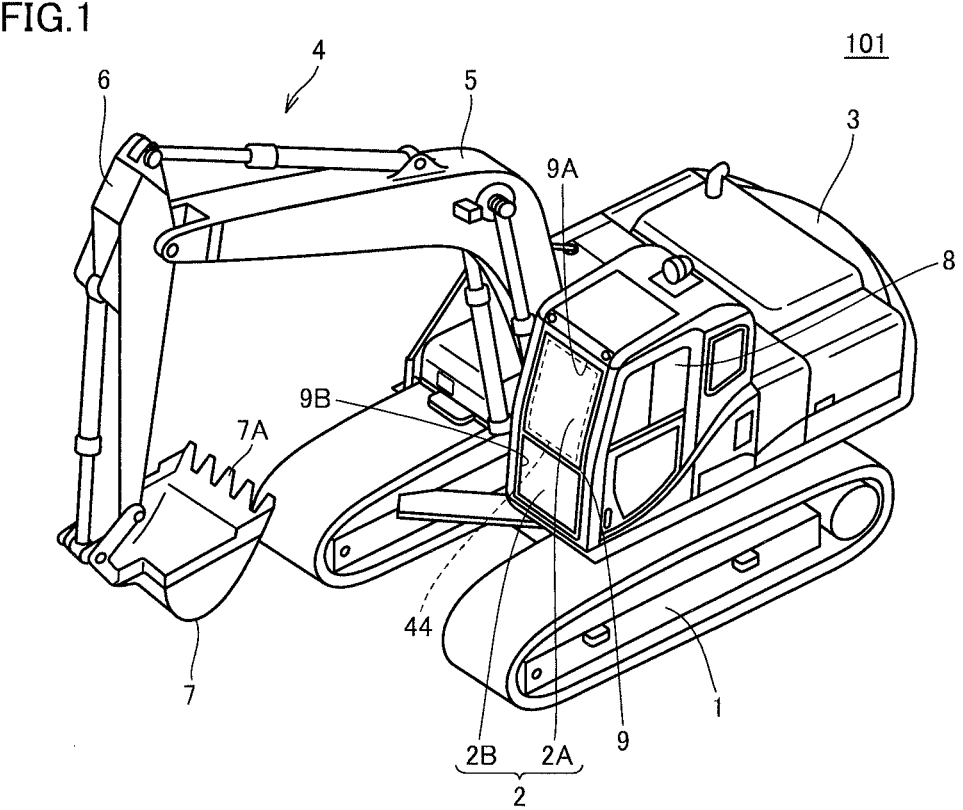
FIG. 1 illustrates an external appearance of a work vehicle.

FIG. 1 is a diagram for illustrating an appearance of a work vehicle 101 according to an embodiment. In the present example, a hydraulic excavator will be described as an example of work vehicle 101 according to the embodiment as shown in FIG. 1.

Work vehicle 101 mainly includes a travel unit 1, a revolving unit 3, and a work implement 4. Work vehicle 101 has a main body composed of travel unit 1 and revolving unit 3. The main body has work implement 4 attached thereto. Travel unit 1 has a pair of right and left crawler belts. Revolving unit 3 is mounted via a revolving mechanism of travel unit 1 revolvably. Revolving unit 3 has a cab 8 and the like.

Work implement 4 is pivotally supported at revolving unit 3 so as to be movable upward and downward and performs a work such as excavation of soil. Work implement 4 includes a boom 5, a dipper stick 6, and a bucket 7. Work implement 4 is provided at a position visually observable on a right and front side as seen from cab 8.

Boom 5 has a base movably coupled to revolving unit 3. Dipper stick 6 is movably coupled to the distal end of boom 5. Bucket 7 is movably coupled to the distal end of dipper stick 6. Bucket 7 is movable upward and downward relative to cab 8. Further, bucket 7 is also movable frontward and rearward relative to cab 8. Bucket 7 has teeth 7A.

Cab 8 has a front windshield 2. Front windshield 2 is fixed by a frame 9. Particularly, front windshield 2 is constituted of a front windshield 2A and a front windshield 2B located below front windshield 2A. More particularly, front windshield 2A is provided inside an upper opening frame 9A (inside the opening frame), and front windshield 2B is provided inside a lower opening frame 9B.

Display device 44 is attached in front of an operator's seat in cab 8 of work vehicle 101. In the present embodiment, display device 44 is composed of a member (a film or the like) which transmits external light incident on cab 8, and a projection device (projector). The projection device projects an image which is in turn displayed as a real image on the member (such as a film) that transmits external light. Display device 44 has a display area provided inside opening frame 9A provided on a front surface of cab 8 of work vehicle 101. The operator in cab 8 can visually observe an actual view of a work site including work implement 4 through the display area of display device 44. Display device 44 overlays on the actual view of the work site and thus display information for assisting the operator to manipulate work implement 4 (hereinafter also referred to as a work) (hereinafter also referred to as work assistance information). Display device 44 functions as a head-up display that directly displays an image in the field of view of the operator.

The member that transmits external light, such as a film, of display device 44 is placed on front windshield 2A. Display device 44 has a display extending to reach an edge of front windshield 2A. Front windshield 2A may be the same as or different from the display area of display device 44 in size.

While in the present embodiment, as display device 44, a configuration will be described in which an image projected by a projection device (projector) is displayed on a member (such as a film) that transmits external light incident on cab 8, this is not exclusive, and it is also possible to have a configuration including display device 44 which is a transparent display (for example, a transmission type liquid crystal display).

<B. Configuration of Control System>

Figure 2:
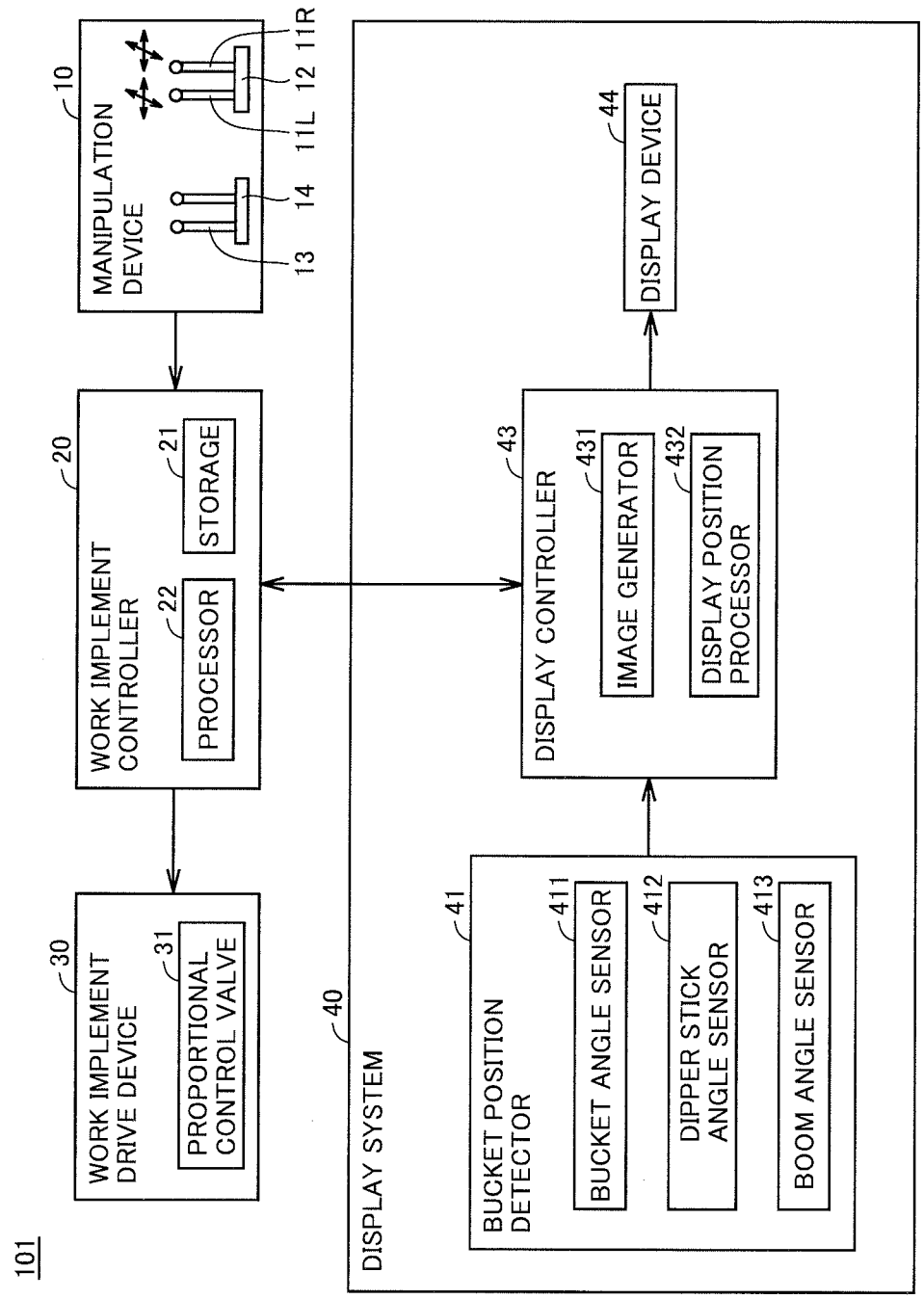
FIG. 2 is a block diagram showing a configuration of a control system included in the work vehicle.

FIG. 2 is a block diagram showing a configuration of a control system included in work vehicle 101. As shown in FIG. 2, work vehicle 101 includes a manipulation device 10, a work implement controller 20, a work implement drive device 30, and a display system 40.

(b1. Manipulation Device 10)

Manipulation device 10 includes manipulation members 11L and 11R, a manipulation detector 12, a travel manipulation member 13, and a travel manipulation detector 14.

Manipulation members 11L and 11R are used by the operator to manipulate work implement 4 and revolving unit 3. Specifically, manipulation member 11R is used by the operator to manipulate boom 5 and bucket 7. Manipulation member 11L is used by the operator to manipulate revolving unit 3 and dipper stick 6.

Manipulation detector 12 detects manipulations performed by the operator to manipulation members 11L and 11R.

Travel manipulation member 13 is used by the operator to control traveling of work vehicle 101. Travel manipulation detector 14 detects a pilot flow rate according to content of control done via travel manipulation member 13. Work vehicle 101 moves at a speed corresponding to the pilot flow rate.

(b2. Work Implement Controller 20)

Work implement controller 20 includes a storage 21 and a processor 22. Storage 21 is composed of memory such as RAM (Random Access Memory) and ROM (Read Only Memory). Processor 22 is composed of a processing device such as a CPU (Central Processing Unit).

Work implement controller 20 mainly controls the operation of work implement 4 and the revolution of revolving unit 3. Particularly, work implement controller 20 generates a control signal for operating work implement 4 and revolving unit 3 in response to manipulations of manipulation members 11L and 11R. Work implement controller 20 outputs the generated control signal to a work implement control device 27.

(b3. Work Implement Drive Device 30)

Work implement drive device 30 has a proportional control valve 31. Proportional control valve 31 operates based on a control signal issued from work implement controller 20. Particularly, proportional control valve 31 supplies a hydraulic cylinder and a revolution motor with hydraulic oil at a flow rate corresponding to the control signal. As a result, work implement 4 operates and revolving unit 3 revolves.

(b4. Display System 40)

Display device 44 of display system 40 displays various types of images such as work assistance information. Display system 40 includes a bucket position detector 41, a display controller 43, and display device 44. In display system 40, a predetermined reference position is preset as a viewpoint position for the operator.

Bucket position detector 41 includes a bucket angle sensor 411, a dipper stick angle sensor 412, and a boom angle sensor 413.

Bucket angle sensor 411 detects a relative angle of bucket 7 from a predetermined reference position. Dipper stick angle sensor 412 detects a relative angle of dipper stick 6 from a predetermined reference position. Boom angle sensor 413 detects a relative angle of boom 5 from a predetermined reference position.

Bucket position detector 41 detects a position of bucket 7 with respect to the body of the work vehicle based on information of the three relative angles as detected. Particularly, bucket position detector 41 detects the position of bucket 7 in the vehicular body coordinate system. Bucket position detector 41 detects the position of teeth 7A of bucket 7, for example, as the position of bucket 7.

Display controller 43 causes the display position of the work assistance information on display device 44 to follow the movement of bucket 7 based on the detected position of bucket 7. Particularly, display controller 43 controls the display position of the work assistance information on display device 44 such that the work assistance information is visually recognized around bucket 7 when viewed from cab 8.

Moreover, when bucket 7 is moved relative to cab 8 in the forward direction or the rearward direction, display controller 43 changes a display manner of the work assistance information on display device 44 based on the detected position of the bucket. Particularly, when bucket 7 is moved in the forward direction and the rearward direction, display controller 43 changes the size of the work assistance information based on the detected position of bucket 7. It should be noted that specific examples of the displayed work assistance information will be described later (FIG. 3 to FIG. 7).

Display controller 43 will be described more in detail as follows. Display controller 43 has an image generator 431 and a display position processor 432.

Image generator 431 generates an image to be displayed on display device 44. Image generator 431 generates an image representing a vehicular speedometer, an engine revolution indicator, a fuel indicator, a hydraulic temperature indicator, and the like. Further, image generator 431 generates images representing a plurality of pieces of work assistance information. A specific example of the work assistance information will be described with reference to FIG. 3 and the like.

Particularly, image generator 431 is connected to a controller (not shown) that controls a motive power system of work vehicle 101. Image generator 431 receives information detected by various sensors, information regarding a content of control performed by the controller, and the like. Based on the received information, image generator 431 generates an image to be displayed on display device 44.

Display position processor 432 calculates a display position of the image on display device 44, and causes the image to be displayed at the calculated display position. Particularly, the display position processor calculates the display position of the work assistance information on display device 44, and causes the work assistance information to be displayed at the calculated position.

Specifically, display position processor 432 calculates the display position of the work assistance information on display device 44 based on the position of bucket 7 detected by bucket position detector 41 and the above-described reference position. Particularly, display position processor 432 calculates the display position at which the work assistance information is to be visually recognized around bucket 7 when viewed from cab 8. Details of the display position calculated by display position processor 432 will be described later (FIG. 3 to FIG. 7).

More particularly, display controller 43 calculates the position of bucket 7 and the position of teeth 7A of bucket 7 on display device 44. With such a calculation process, the display position of the work assistance information can be caused to follow the movement of bucket 7. It should be noted that display controller 43 is implemented by a processor such as a CPU, a storage such as RAM and ROM, and the like.

<C. User Interface>

Next, with reference to FIG. 3 to FIG. 7, the following describes a method for displaying the work assistance information on display device 44. Specifically, first, with reference to FIG. 3 and FIG. 4, a work assistance information following process will be described. Then, with reference to FIG. 5 to FIG. 7, a change in the display manner of the work assistance information will be described.

(c1. Work Assistance Information Following Process)

Figure 3:
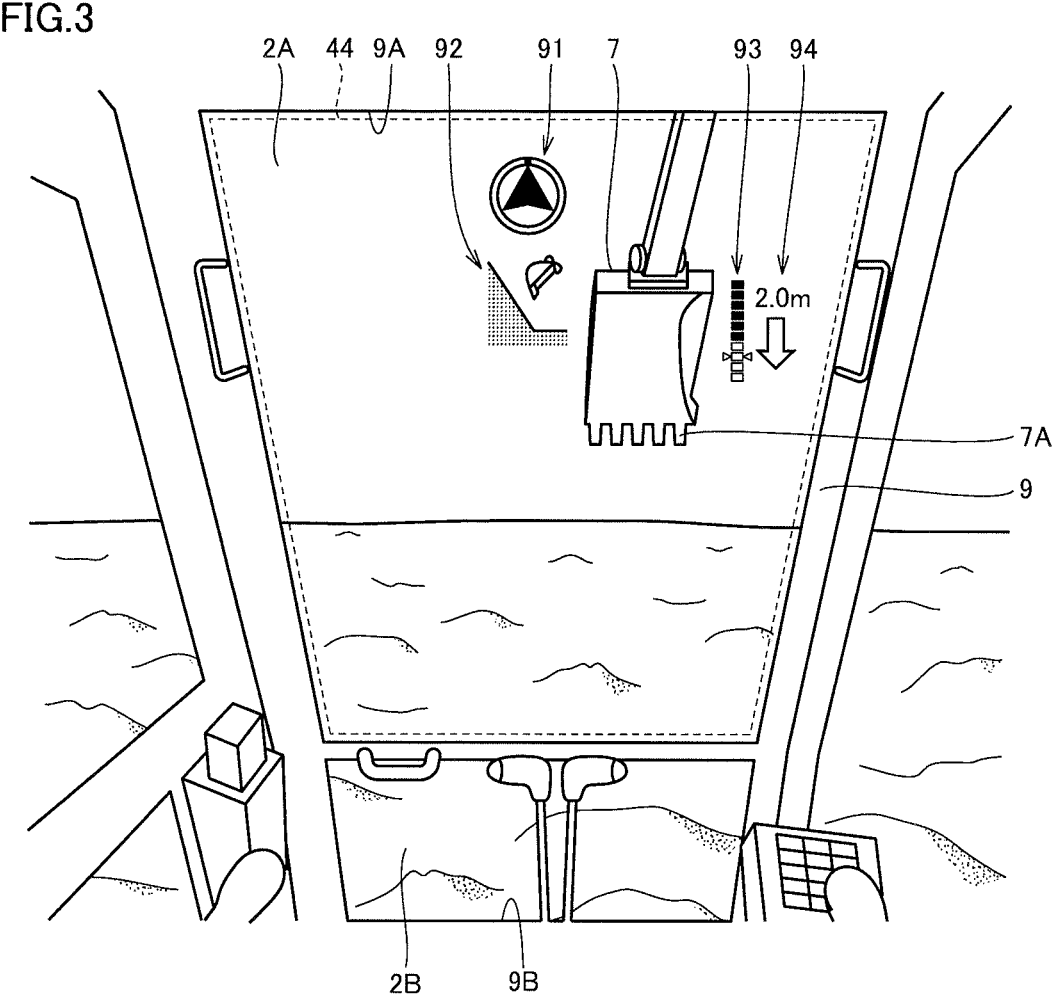
FIG. 3 shows a content displayed on a display device in an aspect.

FIG. 3 shows a content displayed on display device 44 in a certain aspect. As shown in FIG. 3, display controller 43 causes a plurality of pieces of work assistance information 91 to 94 to be displayed at the display area of display device 44. Particularly, display controller 43 causes the plurality of pieces of work assistance information 91 to 94 at respective positions at which the plurality of pieces of work assistance information 91 to 94 are visually recognized around bucket 7. Preferably, display controller 43 causes the plurality of pieces of work assistance information 91 to 94 to be displayed at positions higher than teeth 7A of bucket 7.

In the example of FIG. 3, display controller 43 controls the display positions of the pieces of work assistance information 91, 92 on display device 44 such that the pieces of work assistance information 91, 92 are visually recognized at left positions relative to bucket 7 when viewed from cab 8. Further, display controller 43 controls the display positions of the pieces of work assistance information 93, 94 on display device 44 such that the pieces of work assistance information 93, 94 are visually recognized at right positions relative to bucket 7 when viewed from cab 8.

Work assistance information 91 represents a facing angle compass. The facing angle compass indicates whether or not work vehicle 101 directly faces design topography data. Furthermore, when work vehicle 101 does not directly face the design topography data, the facing angle compass indicates an amount of displacement by way of a rotation angle indicated by an arrow inside a circle. When work vehicle 101 does not directly face the design topography data, display controller 43 may cause work assistance information 91 to be displayed on display device 44 in a manner different from the manner shown in FIG. 3 (for example, in a manner in which a color thereof or the like is changed).

Work assistance information 92 represents the design topography and the teeth in a cross section (lateral cross section).

Work assistance information 93 represents a bar indicator. The bar indicator is displayed when finishing excavation is performed. The bar indicator indicates a distance between the design topography and teeth 7A more in detail than below-described work assistance information 94. Work assistance information 94 indicates a direction of the design topography and a distance between the design topography and teeth 7A.

It should be noted that the pieces of work assistance information 91 to 94 shown in FIG. 3 are exemplary and the work assistance information displayed on display device 44 is not limited thereto.

Figure 4:
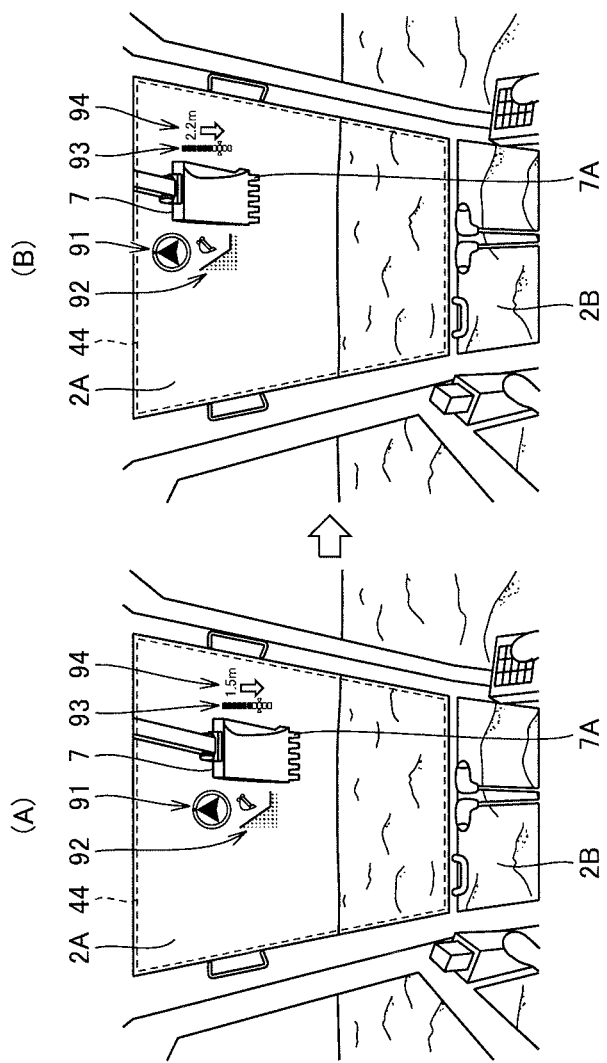
FIG. 4 illustrates each display position of a plurality of pieces of work assistance information when a bucket is moved upward.

FIG. 4 illustrates each display position of the plurality of pieces of work assistance information 91 to 94 when bucket 7 is moved upward. It should be noted that as shown in FIG. 4, bucket 7 in a state (B) is at a position higher than that of bucket 7 in a state (A).

In the state (A), as with FIG. 3, display system 40 displays the four pieces of work assistance information 91 to 94.

When bucket 7 is moved upward from the state (A), display controller 43 performs a process for causing the display positions of the pieces of work assistance information 91 to 94 on display device 44 to follow the movement of bucket 7 based on a position of bucket 7 sequentially detected by bucket position detector 41. More particularly, as in the state (B), display controller 43 causes the display positions of the pieces of work assistance information 91 to 94 to follow the movement of bucket 7 to attain a constant relative positional relation between bucket 7 and each of the pieces of work assistance information 91 to 94.

Particularly, display controller 43 controls the display positions of the pieces of work assistance information 91 to 94 on display device 44 such that the pieces of work assistance information 91 to 94 are visually recognized around bucket 7 when viewed from cab 8. More particularly, display controller 43 not only causes the pieces of work assistance information 91 to 94 to follow the movement of bucket 7 in the upward direction and the downward direction, but also causes the pieces of work assistance information 91 to 94 to follow the movement of bucket 7 relative to cab 8 in the forward direction and the rearward direction.

As described above, display controller 43 causes the display position of the work assistance information on display device 44 to follow the movement of bucket 7 such that the work assistance information is visually recognized around bucket 7 when viewed from cab 8.

Moreover, display controller 43 is configured to control the display position of the work assistance information on display device 44 such that the work assistance information is visually recognized at a left position or a right position relative to bucket 7 when viewed from cab 8. According to the above-described configuration, the work assistance information is not displayed at least below teeth 7A. Therefore, displaying can be performed with excellent workability for the operator.

Moreover, work implement 4 is provided at a right side relative to cab 8. Further, display controller 43 controls the display position of the work assistance information on display device 44 such that the work assistance information is visually recognized at the left position relative to bucket 7 when viewed from cab 8. According to the above-described configuration, the work assistance information can be displayed in a manner suitable in view of the attachment position of the work implement to the main body.

(c2. Changing Display Manner of Work Assistance Information)

The following illustratively describes three examples as exemplary changes in the display manner of the work assistance information. Particularly, the following describes methods for changing the display manners of the pieces of work assistance information 92 and 93 when bucket 7 is moved relative to cab 8 in the forward direction and the rearward direction.

(1) First Exemplary Change

Figure 5:
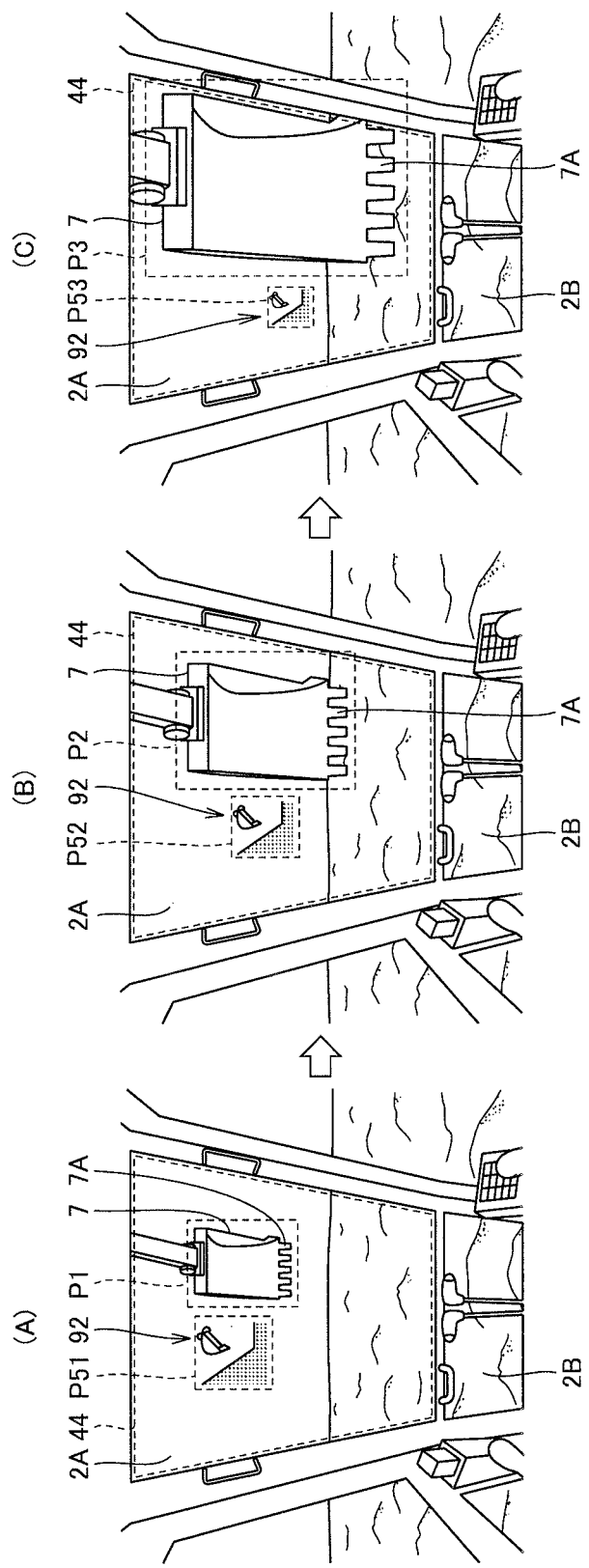
FIG. 5 illustrates a first exemplary change in a display manner of the work assistance information when the bucket is moved in a direction (rearward direction) in which the bucket becomes close to a cab.

FIG. 5 illustrates a first exemplary change in the display manner of work assistance information 92 when bucket 7 is moved in the direction (rearward direction) in which bucket 7 becomes close to cab 8. As shown in FIG. 5, bucket 7 in a state (B) is at a position closer to cab 8 than bucket 7 in a state (A). Moreover, bucket 7 in a state (C) is at a position closer to cab 8 than bucket 7 in the state (B).

When bucket 7 is at a position P1 as shown in the state (A), display system 40 displays work assistance information 92 at a left position P51 relative to bucket 7 when viewed from the operator in cab 8. Particularly, display controller 43 of display system 40 causes work assistance information 92 to be displayed at position P51 in a first size. More particularly, display controller 43 causes work assistance information 92 to be displayed at a position higher than teeth 7A of bucket 7.

When bucket 7 is moved rearward (toward the cab 8 side) from the state (A), display controller 43 performs a process for causing the display position of work assistance information 92 on display device 44 to follow the movement of bucket 7 based on a position of bucket 7 sequentially detected by bucket position detector 41. More particularly, display controller 43 causes the display position of work assistance information 92 to follow the movement of bucket 7 to attain a constant relative positional relation between bucket 7 and work assistance information 92. Further, display controller 43 gradually decreases the display size of work assistance information 92 from the first size as bucket 7 is moved in the rearward direction.

For example, when bucket 7 reaches a position P2 as shown in the state (B), display controller 43 causes work assistance information 92 to be displayed at a position P52. Particularly, display controller 43 causes work assistance information 92 to be displayed at position P52 in a second size smaller than the first size.

When bucket 7 is moved further in the rearward direction after the state (B), display controller 43 performs a process for further decreasing the size of work assistance information 92 while causing the display position of work assistance information 92 to follow the movement of bucket 7.

For example, when bucket 7 reaches a position P3 as shown in the state (C), display controller 43 causes work assistance information 92 to be displayed at a position P53. Particularly, display controller 43 causes work assistance information 92 to be displayed at position P53 in a third size smaller than the second size.

It should be noted that positions P52, P53 are left positions relative to bucket 7 when viewed from the operator. Also at each of these positions, the positional relation between bucket 7 and work assistance information 92 is maintained to be constant. Hence, work assistance information 92 is displayed at a position higher than teeth 7A of bucket 7.

The above-described process can be summarized as described in (i) to (iv) below.

(i) Display controller 43 controls the display position of work assistance information 92 on display device 44 such that work assistance information 92 is visually recognized around bucket 7 when viewed from cab 8. Display controller 43 changes the display manner of work assistance information 92 on display device 44 based on the position of bucket 7 detected by bucket position detector 41, when bucket 7 is moved relative to cab 8 in the forward direction and the rearward direction.

When bucket 7 is moved in the forward direction and the rearward direction, the size of bucket 7 visually recognized by the operator in cab 8 through display device 44 is changed. Hence, in order to improve the operability of work vehicle 101, it may be preferable to change the display manner of work assistance information 92 in accordance with the visually recognized size of bucket 7.

Therefore, by changing the display manner of work assistance information 92 on display device 44 based on the position of bucket 7 when bucket 7 is moved relative to cab 8 in the forward direction and the rearward direction as in the above-described configuration, the operability of work vehicle 101 can be improved as compared with a configuration in which the display manner is not changed upon the movement of bucket 7 in the forward direction and the rearward direction.

(ii) Specifically, display controller 43 changes the size of work assistance information 92 on display device 44 based on the position of bucket 7 detected by bucket position detector 41, when bucket 7 is moved in the forward direction and the rearward direction. According to such a configuration, the operability of work vehicle 101 can be improved as compared with the configuration in which the display size of work assistance information 92 is not changed upon the movement of bucket 7 in the frontward direction and the rearward direction.

(iii) Particularly, display controller 43 causes work assistance information 92 to be displayed on display device 44 in the first size when bucket 7 is at position P1. When bucket 7 is at position P2 closer to cab 8 than position P1, display controller 43 causes work assistance information 92 to be displayed on display device 44 in the second size smaller than the first size.

According to such a configuration, the display size of work assistance information 92 when the bucket is at position P2 at which the bucket is visually recognized as being large when viewed by the operator in cab 8 becomes smaller than the display size of work assistance information 92 when bucket 7 is at position P1. Hence, in work vehicle 101, work assistance information 92 can continue to be displayed around bucket 7 even when bucket 7 reaches position P2 closer to the operator's seat.

(iv) More particularly, display controller 43 gradually decreases the size of work assistance information 92 on display device 44 as bucket 7 becomes closer to cab 8. According to such a configuration, as bucket 7 becomes closer to cab 8, displayed work assistance information 92 becomes smaller. Hence, the operability of the work vehicle can be improved as compared with a case of abruptly changing the size of work assistance information 92.

(2) Second Exemplary Change

Figure 6:
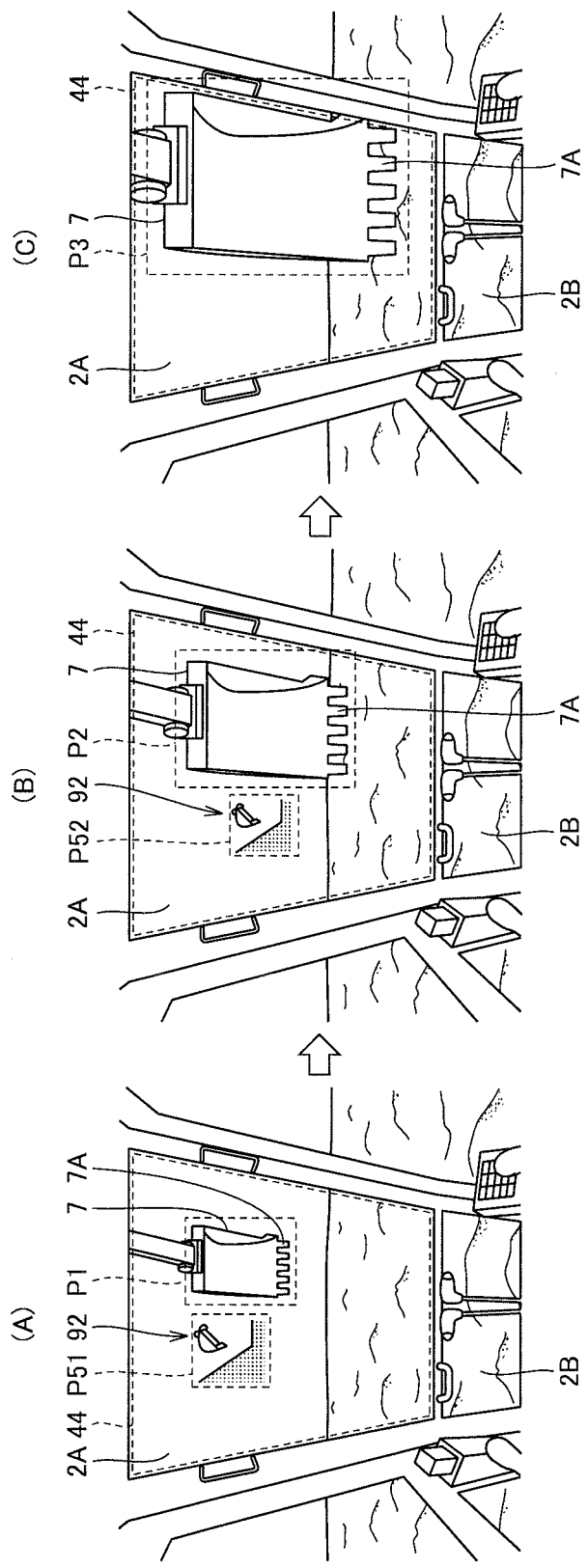
FIG. 6 illustrates a second exemplary change in the display manner of the work assistance information when the bucket is moved in the direction (rearward direction) in which the bucket becomes close to the cab.

FIG. 6 illustrates a second exemplary change in the display manner of work assistance information 92 when bucket 7 is moved in the direction (rearward direction) in which bucket 7 becomes close to cab 8. As shown in FIG. 6, bucket 7 in a state (B) is at a position closer to cab 8 than bucket 7 in a state (A). Moreover, bucket 7 in a state (C) is at a position closer to cab 8 than bucket 7 in the state (B). It should be noted that the state (A) of FIG. 6 is the same as the state (A) of FIG. 5, and the state (B) of FIG. 6 is the same as the state (B) of FIG. 5. Therefore, the state (A) and the state (B) of FIG. 6 are not repeatedly described here.

When bucket 7 is further moved in the rearward direction to reach a position P3 (state (C)) after the state (B), display controller 43 stops displaying work assistance information 92. As such, display controller 43 does not cause work assistance information 92 to be displayed on display device 44 when bucket 7 is at position P3 closer to cab 8 than position P2.

The visually recognized size of bucket 7 by the operator in cab 8 when bucket 7 is at position P3 is larger than the visually recognized size of bucket 7 when bucket 7 is at position P2. In such a case, if the size of work assistance information 92 is decreased to be too small, the operator cannot accurately recognize the content indicated by work assistance information 92. Hence, when bucket 7 is at position P3 closer to the cab than position P2, work assistance information 92 stops being displayed as described above, whereby the operability of work vehicle 101 can be improved.

(3) Third Exemplary Change

Figure 7:
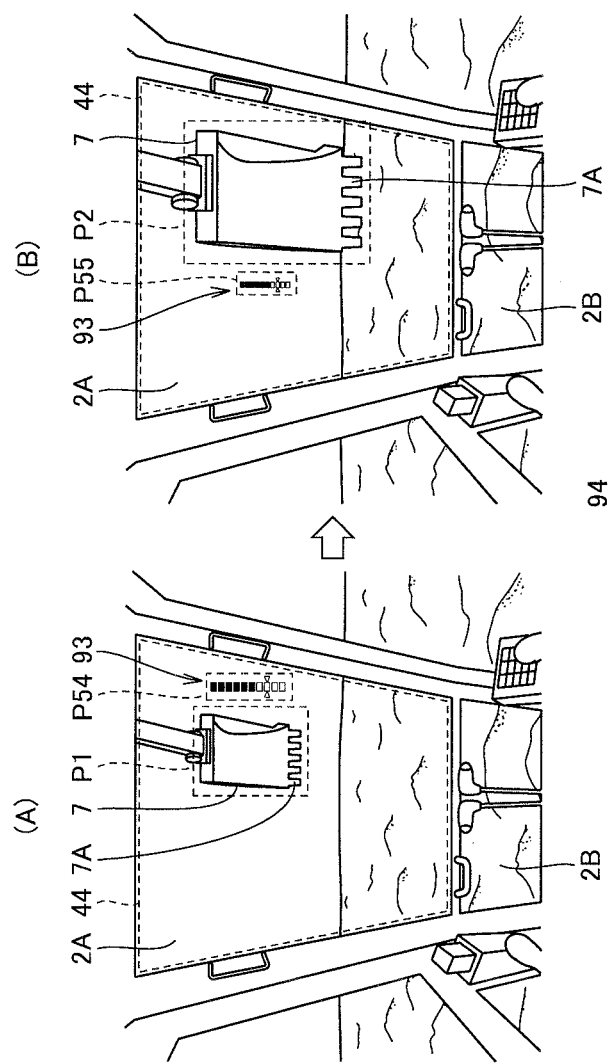
FIG. 7 illustrates a third exemplary change in the display manner of the work assistance information when the bucket is moved in the direction (rearward direction) in which the bucket becomes close to the cab.

FIG. 7 illustrates a third exemplary change in the display manner of work assistance information 92 when bucket 7 is moved in the direction (rearward direction) in which bucket 7 becomes close to cab 8. As shown in FIG. 7, bucket 7 in a state (B) is at a position closer to cab 8 than bucket 7 in a state (A).

When bucket 7 is at a position P1 as shown in the state (A), display system 40 displays work assistance information 93 at a right position P54 relative to bucket 7 when viewed from the operator in cab 8. Particularly, display controller 43 of display system 40 causes work assistance information 93 to be displayed at position P54 in a first size. More particularly, display controller 43 causes work assistance information 93 to be displayed at a position higher than teeth 7A of bucket 7.

When bucket 7 is moved rearward (toward the cab 8 side) from the state (A), display controller 43 performs a process for causing the display position of work assistance information 93 on display device 44 to follow the movement of bucket 7 based on a position of bucket 7 sequentially detected by bucket position detector 41. More particularly, display controller 43 causes the display position of work assistance information 93 to follow the movement of bucket 7 to attain a constant relative positional relation between bucket 7 and work assistance information 93. Further, display controller 43 gradually decreases the display size of work assistance information 93 from the first size as bucket 7 is moved in the rearward direction.

When bucket 7 is at a position P2 as shown in the state (B), display controller 43 causes work assistance information 93 to be displayed at a left position P55 relative to bucket 7 when viewed from the operator in cab 8. Particularly, display controller 43 changes the display position of work assistance information 93 to a side opposite to that in the state (A) relative to bucket 7. Further, display controller 43 causes work assistance information 93 to be displayed at position P55 in a second size smaller than the first size.

Also at each of positions P54, P55, the positional relation between bucket 7 and work assistance information 93 is maintained to be constant, so that work assistance information 93 is displayed at a position higher than teeth 7A of bucket 7.

As described above, when bucket 7 is at position P1, display controller 43 controls the display position of work assistance information 93 on display device 44 such that work assistance information 93 is visually recognized at a right position relative to bucket 7 when viewed from cab 8. When bucket 7 is at position P2, display controller 43 controls the display position of work assistance information 93 on display device 44 such that work assistance information 93 is visually recognized at a left position relative to bucket 7 when viewed from cab 8. According to the above-described configuration, even when bucket 7 becomes close to cab 8, work assistance information 93 can continue to be displayed around bucket 7.

It should be noted that when the position of work implement 4 is at the left side relative to cab 8, display controller 43 may be configured as follows. When bucket 7 is at a position P1', display controller 43 controls the display position of the work assistance information on display device 44 such that the work assistance information is visually recognized at a left position relative to bucket 7 when viewed from cab 8. When bucket 7 is at position P2 closer to cab 8 than position P', display controller 43 controls the display position of work assistance information 93 on display device 44 such that the work assistance information is visually recognized at a right position relative to bucket 7 when viewed from cab 8. Also in this case, the following effect can be obtained: even when bucket 7 becomes close to cab 8, work assistance information 93 can continue to be displayed around bucket 7.

<D. Control Structure>

Figure 8:
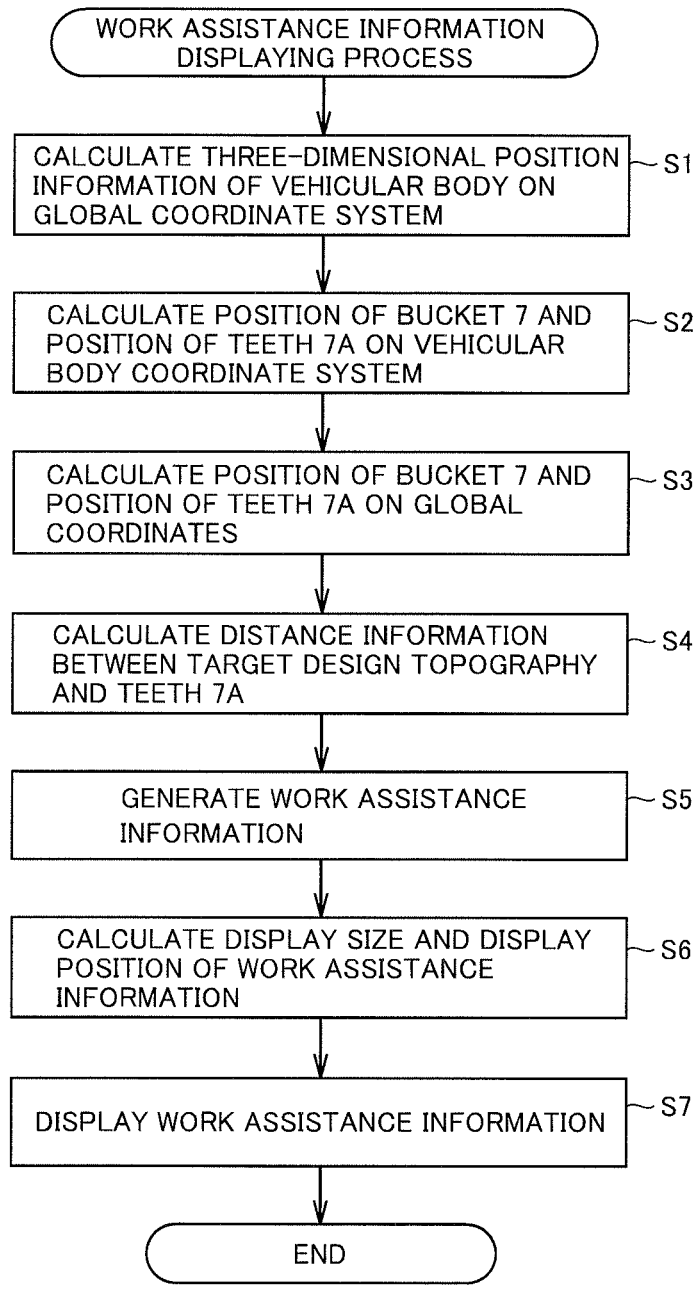
FIG. 8 is a flowchart for illustrating a process for displaying the work assistance information.

FIG. 8 is a flowchart for illustrating a process for displaying the work assistance information. As shown in FIG. 8, in a step S1, display controller 43 calculates three-dimensional position information of work vehicle 101 on a global coordinate system. In a step S2, display controller 43 calculates the position of bucket 7 and the position of teeth 7A on the vehicular body coordinate system. In a step S3, display controller 43 calculates the position of bucket 7 and the position of teeth 7A on the global coordinates. It should be noted that the position of bucket 7 on the global coordinate system and the like are calculated in order to display, on display device 44, information employing target topography information stored in advance.

In a step S4, display controller 43 calculates distance information between the target design topography and teeth 7A based on the current position of teeth of bucket 7 on the global coordinates and the above-described target topography information. In a step S5, display controller 43 generates a display content of the work assistance information based on the distance information calculated in step S4. In a step S6, display controller 43 calculates the display size of the work assistance information and the display position of the work assistance information based on the current position of bucket 7 (particularly, the current position of teeth 7A) on the vehicular body coordinate system as calculated in step S2. In a step S7, display controller 43 causes the work assistance information to be displayed in the calculated display size at the display position calculated in step S6.

<E. Modifications>

(e1. First Modification)

Figure 9:
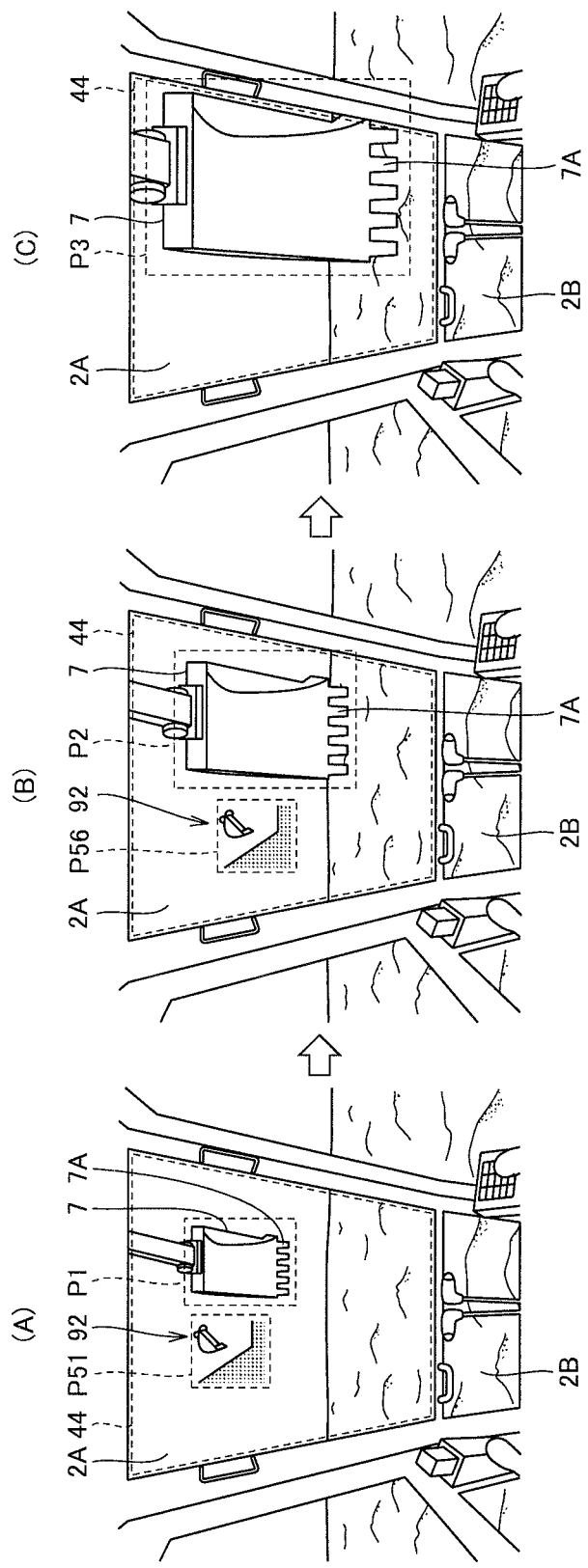
FIG. 9 illustrates a modification for the second exemplary change illustrated with reference to FIG. 6.

FIG. 9 illustrates a modification for the second exemplary change described with reference to FIG. 6. As shown in FIG. 9, bucket 7 in a state (B) is at a position closer to cab 8 than bucket 7 in a state (A). Moreover, bucket 7 in a state (C) is at a position closer to cab 8 than bucket 7 in the state (B). It should be noted that the state (A) of FIG. 9 is the same as the state (A) of FIG. 6, and the state (C) of FIG. 9 is the same as the state (C) of FIG. 6. Therefore, the state (A) and the state (C) of FIG. 9 are not repeatedly described here.

When bucket 7 is moved rearward (toward the cab 8 side) from the state (A), display controller 43 performs a process for causing the display position of work assistance information 92 on display device 44 to follow the movement of bucket 7 based on a position of bucket 7 sequentially detected by bucket position detector 41. More particularly, display controller 43 causes the display position of work assistance information 92 to follow the movement of bucket 7 to attain a constant relative positional relation between bucket 7 and work assistance information 92.

In this case, display controller 43 does not change the display size of work assistance information 92 from the above-described first size. Particularly, even when bucket 7 is moved in the rearward direction, display controller 43 does not perform the control for changing the size of work assistance information 92. Thus, this modification is different from the second exemplary change (FIG. 6) in that the size of work assistance information 92 is not changed.

Moreover, when bucket 7 is further moved in the rearward direction to reach a position P3 (state (C)) after the state (B), display controller 43 stops displaying work assistance information 92. As such, display controller 43 does not cause work assistance information 92 to be displayed on display device 44 when bucket 7 is at position P3 closer to cab 8 than position P2.

As described above, when bucket 7 is at position P1 and when bucket 7 is at position P2 closer to cab 8 than position P1, display controller 43 causes work assistance information 92 to be displayed on display device 44 in the first size (predetermined size). Display controller 43 does not cause work assistance information 92 to be displayed on display device 44 when bucket 7 is at position P3 closer to cab 8 than position P2.

As described above, the visually recognized size of bucket 7 by the operator in cab 8 when bucket 7 is at position P3 is larger than the visually recognized size of bucket 7 when bucket 7 is at position P2. In such a case, work assistance information 92 may be unable to be caused to follow the bucket to be around the bucket. Therefore, by stopping displaying work assistance information 92 at position P3 as in the above-described configuration, the situation in which the display position of the work assistance information cannot follow the bucket can be handled.

(e2. Second Modification)

While in the above description a configuration in which display device 44 displays in a display area inside opening frame 9A has been described as an example, the present invention is not limited thereto. Display device 44 may also display an inside of opening frame 9B as a display area. That is, cab 8 may be configured to include a transparent dual display. In that case, display controller 43 will control displaying in two display areas. It is also possible to provide another display device for the display area of opening frame 9B.

A work vehicle having such a configuration can also achieve an effect similar to that obtained by work vehicle 101 described above. Note that in the above case, the work assistance information can also be displayed in a display area of the lower display device.

(e3. Third Modification)

Work vehicle 101 may include a display device having a configuration different from that of display device 44. Specifically, work vehicle 101 may include a combiner as a display device.

Figure 10:
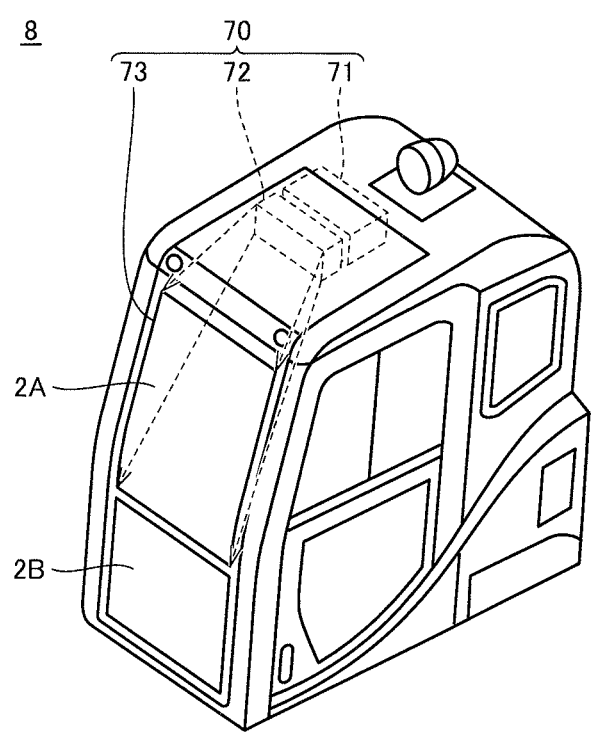
FIG. 10 shows another display device having a configuration different from that of the foregoing display device.

FIG. 10 shows another display device having a configuration different from that of display device 44 according to an embodiment. As shown in FIG. 10, a display device 70 is provided in cab 8, and has a projection device 71, an optical lens system 72, and a combiner 73.

Projection device 71 is a projector. Optical lens system 72 is disposed between projection device 71 and combiner 73. Optical lens system 72 has a plurality of lenses. Optical lens system 72 has the plurality of lenses with some thereof movable along the optical axis.

Combiner 73 is disposed at front windshield 2A. Combiner 73 may be disposed at front windshield 2A and front windshield 2B. Combiner 73 is composed of a half mirror which reflects a part of light and transmits a remainder thereof. Combiner 73 reflects an image projected by projection device 71 to the side of the operator in cab 8 and transmits light from the outside of cab 8 to the interior of cab 8.

Thus, display device 70 allows the operator to recognize the image projected on combiner 73 as a virtual image overlaid and thus displayed on an actual view in front of cab 8.

Thus a work vehicle comprising display device 70 using combiner 73 can also achieve an effect similar to that of work vehicle 101 of an embodiment.

While a hydraulic excavator has been described as an example of a work vehicle, the work vehicle is also applicable to a backhoe loader and other work vehicles.

The embodiments disclosed herein are illustrative and are not limited to only the content above. The scope of the present invention is defined by the terms of the claims, and is intended to include any modifications within the scope and meaning equivalent to the terms of the claims.

REFERENCE SIGNS LIST

1: travel unit; 2, 2A, 2B: front windshield; 3: revolving unit; 4: work implement; 5: boom; 6: dipper stick; 7: bucket; 7A: teeth; 8: cab; 9: frame; 9A, 9B: opening frame; 10: manipulation device; 11L, 11R, 31L: manipulation member; 12, 12L, 12R: manipulation detector; 13: travel manipulation member, 14: travel manipulation detector; 20: work implement controller; 21: storage; 22: processor; 27: work implement controller; 30: work implement drive device; 31: proportional control valve; 40: display system; 41: bucket position detector; 43: display controller; 44, 70: display device; 71: projection device; 72: optical lens system; 73: combiner; 91, 92, 93, 94: work assistance information; 101: work vehicle; 411: bucket angle sensor, 412: dipper stick angle sensor; 413: boom angle sensor; 431: image generator; 432: display position processor.

The invention claimed is:

1. A work vehicle comprising:
work implement having a bucket;
a main body to which the work implement is attached, the main body having a cab;
a display device provided in the cab and configured to display work assistance information to be overlaid on an actual view of a work site;
a display controller configured to cause the work assistance information to be displayed on the display device; and
a bucket position detector configured to detect a position of the bucket relative to the main body,
the display controller being configured to
cause a display position of the work assistance information on the display device to follow a movement of the bucket, and
change a size of the work assistance information on the display device based on the position detected by the bucket position detector, when the bucket is moved relative to the cab in a forward direction and a rearward direction.

2. The work vehicle according to claim 1, wherein the display controller is configured to
cause the work assistance information to be displayed on the display device in a first size when the bucket is at a first position, and
cause the work assistance information to be displayed on the display device in a second size smaller than the first size, when the bucket is at a second position closer to the cab than the first position.

3. The work vehicle according to claim 2, wherein the display controller is configured not to cause the work assistance information to be displayed on the display device when the bucket is at a third position closer to the cab than the second position.

4. The work vehicle according to claim 2, wherein as the bucket becomes closer to the cab, the display controller is configured to gradually decrease the size of the work assistance information on the display device.

5. The work vehicle according to claim 1, wherein the display controller is configured to control the display position of the work assistance information on the display device such that the work assistance information is visually recognized at a left position or a right position relative to the bucket when viewed from the cab.

6. The work vehicle according to claim 5, wherein
the work implement is provided at a right side relative to the cab, and
the display controller is configured to control the display position of the work assistance information on the display device such that the work assistance information is visually recognized at the left position relative to the bucket when viewed from the cab.

7. The work vehicle according to claim 2, wherein
when the bucket is at the first position, the display controller is configured to control the display position of the work assistance information on the display device such that the work assistance information is visually recognized at one of a left position and a right position relative to the bucket when viewed from the cab, and
when the bucket is at the second position, the display controller is configured to control the display position of the work assistance information on the display device such that the work assistance information is visually recognized at the other of the left position and the right position relative to the bucket when viewed from the cab.

8. The work vehicle according to claim 1, wherein the display controller is configured to cause the display position of the work assistance information on the display device to follow the movement of the bucket such that the work assistance information is visually recognized around the bucket when viewed from the cab.

9. A display control method in a work vehicle,
the work vehicle including
a work implement having a bucket,
a main body to which the work implement is attached, the main body having a cab, and
a display device provided in the cab and configured to display work assistance information to be overlaid on an actual view of a work site,
the display control method comprising:
detecting a position of the bucket relative to the main body;
displaying the work assistance information on the display device while causing the work assistance information to follow a movement of the bucket; and
changing a size of the work assistance information on the display device based on the detected position when the bucket is moved relative to the cab in a forward direction and a rearward direction.

10. A work vehicle comprising:
work implement having a bucket;
a main body to which the work implement is attached, the main body having a cab;
a display device provided in the cab and configured to display work assistance information to be overlaid on an actual view of a work site;
a display controller configured to cause the work assistance information to be displayed on the display device; and
a bucket position detector configured to detect a position of the bucket relative to the main body, the display controller being configured to
cause a display position of the work assistance information on the display device to follow a movement of the bucket,
cause the work assistance information to be displayed on the display device in a predetermined size when the bucket is at a first position and when the bucket is at a second position closer to the cab than the first position, and
cause the work assistance information not to be displayed on the display device when the bucket is at a third position closer to the cab than the second position.

* * * * *